US012159747B2

(12) United States Patent
Bi

(10) Patent No.: US 12,159,747 B2
(45) Date of Patent: Dec. 3, 2024

(54) MAGNETIC ELEMENT AND ELECTRONIC DEVICE

(71) Applicant: Huawei Digital Power Technologies Co., Ltd., Shenzhen (CN)

(72) Inventor: Jianguo Bi, Dongguan (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 246 days.

(21) Appl. No.: 17/980,166

(22) Filed: Nov. 3, 2022

(65) Prior Publication Data

US 2023/0133417 A1 May 4, 2023

(30) Foreign Application Priority Data

Nov. 4, 2021 (CN) ........................ 202111299457.3

(51) Int. Cl.

*H01F 41/02* (2006.01)
*H01F 3/08* (2006.01)
*H01F 27/255* (2006.01)

(52) U.S. Cl.

CPC ........... *H01F 41/0246* (2013.01); *H01F 3/08* (2013.01); *H01F 27/255* (2013.01)

(58) Field of Classification Search

CPC ....... H01F 3/08; H01F 27/255; H01F 41/0246
USPC ........................................................... 310/44
See application file for complete search history.

(56) References Cited

U.S. PATENT DOCUMENTS

| | | | | |
|---|---|---|---|---|
| 3,659,191 | A * | 4/1972 | Spreadbury | H01F 29/146 336/215 |
| 2007/0200437 | A1* | 8/2007 | El-Antably | H02K 3/325 310/216.137 |
| 2007/0257759 | A1 | 11/2007 | Lee et al. | |
| 2018/0053596 | A1* | 2/2018 | Ikriannikov | H01F 38/08 |
| 2018/0145546 | A1* | 5/2018 | Bojiuc | H01F 27/346 |
| 2018/0204669 | A1 | 7/2018 | Kobayashi et al. | |
| 2020/0066433 | A1* | 2/2020 | Södö | H01F 17/04 |
| 2020/0312515 | A1 | 10/2020 | Nah et al. | |
| 2021/0358673 | A1* | 11/2021 | Lu | H01F 27/325 |

(Continued)

FOREIGN PATENT DOCUMENTS

| | | |
|---|---|---|
| CN | 102368424 A | 3/2012 |
| CN | 207021112 U | 2/2018 |

(Continued)

*Primary Examiner* — Rashad H Johnson
(74) *Attorney, Agent, or Firm* — WOMBLE BOND DICKINSON (US) LLP

(57) ABSTRACT

Embodiments of this application provide a magnetic element and an electronic device. The magnetic element is used in an electronic device. The magnetic element includes a composite magnetic core and a winding. The composite magnetic core includes an external magnetic shell and an internal magnet. The internal magnet is formed by a wound strip material. The external magnetic shell partially or entirely covers a periphery of the internal magnet. The external magnetic shell is fixedly connected to the internal magnet. The winding is on an outer surface of the external magnetic shell. The external magnetic shell is configured to protect the internal magnet from pulling force in a winding process of the winding. The external magnetic shell is configured to increase common-mode impedance of the magnetic element and improve a filtering effect of the magnetic element.

20 Claims, 7 Drawing Sheets

(56) References Cited

U.S. PATENT DOCUMENTS

| | | | | |
|---|---|---|---|---|
| 2022/0028594 | A1* | 1/2022 | Dubois | H01F 17/045 |
| 2023/0230747 | A1* | 7/2023 | Hong | H01F 27/292<br>336/170 |
| 2023/0230761 | A1* | 7/2023 | Hong | H01F 27/24<br>336/105 |
| 2023/0361637 | A1* | 11/2023 | Ibrahim | H02K 21/12 |
| 2024/0063712 | A1* | 2/2024 | Yang | H02M 1/123 |

FOREIGN PATENT DOCUMENTS

| | | | |
|---|---|---|---|
| CN | 106158225 | B | 9/2018 |
| CN | 208922882 | U | 5/2019 |
| CN | 110993254 | A | 4/2020 |
| EP | 0794539 | A1 | 9/1997 |
| IN | 202905391 | U | 4/2013 |
| JP | 2000228319 | A | 8/2000 |

* cited by examiner

MAGNETIC ELEMENT AND ELECTRONIC DEVICE

CROSS-REFERENCE TO RELATED APPLICATIONS

This application claims priority to Chinese Patent Application No. 202111299457.3, filed on Nov. 4, 2021, which is hereby incorporated by reference in its entirety.

TECHNICAL FIELD

This application relates to a magnetic element and an electronic device.

BACKGROUND

With the development of modern science, various electronic and electrical devices provide high efficiency for social production, and greatly facilitate people's daily life. At the same time, electromagnetic interference and radiation generated in a working process of the electronic and electrical devices affects people's life and production, and leads to deterioration in an electromagnetic environment of human living space. A magnetic element is used in an electronic device, has a filtering function, can filter an electromagnetic interference signal, and can suppress outward radiation and emission of an electromagnetic wave generated by a high-speed signal cable. How to design a magnetic element for which not only a volume and costs of the magnetic element can be controlled but common-mode impedance of the magnetic element can also be increased is a research direction in the industry.

SUMMARY

Embodiments of this application provide a magnetic element and an electronic device.

According to a first aspect, a magnetic element is provided. The magnetic element is used in an electronic device, and is configured to suppress outward radiation of an electromagnetic wave generated by a high-speed signal cable in the electronic device. The magnetic element includes a composite magnetic core and a winding, the composite magnetic core includes an internal magnet and an external magnetic shell, the internal magnet is formed by winding a strip material, the external magnetic shell partially or entirely covers a periphery of the internal magnet, the external magnetic shell is fixedly connected to the internal magnet, the winding is wound on an outer surface of the external magnetic shell, the external magnetic shell is configured to protect the internal magnet from pulling force in a process of winding the winding, and the external magnetic shell is configured to increase common-mode impedance of the magnetic element.

For the internal magnet formed by winding the strip material, a coil cannot be directly wound on an outer surface of the internal magnet, because pulling stress acting on a surface of the internal magnet may be generated in a process of winding the coil, and the stress may destroy the internal magnet and affect a filtering function of the magnetic element. Because the external magnetic shell in the composite magnetic core provided in this application has a magnetic material, as a protective shell covering the periphery of the internal magnet, the external magnetic shell can not only protect the internal magnet from pulling stress in a wire winding process, but also improve the filtering function of the magnetic element. The external magnetic shell in the composite magnetic core has the magnetic material, and the winding is wound on an outer surface of the external magnetic shell. The external magnetic shell has a function of filtering electromagnetic noise, so that the filtering effect of the magnetic element can be improved. If the external magnetic shell has no magnetic material, but has only a function of protecting the internal magnet, and the external magnetic shell is made of a non-magnetic material, such an external magnetic shell in the composite magnetic core cannot participate in the filtering function of the magnetic element. If the external magnetic shell occupies space of the composite magnetic core but has no filtering function, this is not conducive to a miniaturization design of the magnetic element, and consequently, a volume and costs of the magnetic element are increased.

In an embodiment, a material of the external magnetic shell includes at least one of ferrite or alloy magnetic powder. In this solution, the material of the external magnetic shell is specifically limited. The external magnetic shell may be a single material, or may be formed by combining a plurality of materials.

In an embodiment, a material of the internal magnet includes at least one of amorphous alloy or nanocrystalline. In this solution, the material of the internal magnet is limited, and may be a single material (e.g., an amorphous material or a nanocrystalline material), or may be a combination of an amorphous material and a nanocrystalline material.

In an embodiment, a material of the internal magnet is a nanocrystalline strip material, and a material of the external magnetic shell is ferrite. In this solution, the material of the internal magnet and the material of the external magnetic shell are limited, and the internal magnet of the nanocrystalline strip material and the external magnetic shell of the ferrite are combined in one composite magnetic core, so that performance of a common-mode inductor can be improved while a volume and costs of the composite magnetic core are properly controlled. In this way, not only the magnetic element has a relatively good filtering effect, but overall performance of the magnetic element can also be improved in a design condition that a relatively small volume and relatively low costs are controlled.

In an embodiment, a material of the internal magnet is a nanocrystalline strip material, and a material of the external magnetic shell is a combination of manganese zinc ferrite, nickel zinc ferrite, and alloy magnetic powder. In this solution, the material of the internal magnet and the material of the external magnetic shell are limited, and the internal magnet of the nanocrystalline strip material matches the external magnetic shell made of the combined material, so that wideband (e.g., 150 kHz to 300 MHz) filtering can be implemented. In other words, in this solution, a frequency range of an electromagnetic filtering signal filtered by the magnetic element is relatively wide, and may be 150 kHz to 300 MHz. In this solution, the volume and the costs of the magnetic element can also be reduced. A filtering range of a magnetic element in a conventional technology is (e.g., 150 kHz to 30 MHz, or 30 MHz to 300 MHz). Compared with the conventional technology, filtering bandwidth is widened in this application.

In an embodiment, the external magnetic shell is an integrated structure, and is formed on the outer surface of the internal magnet through packaging or coating. The integrated structure facilitates a design of a small size of the composite magnetic core and reduces plate space occupied by the magnetic element.

In an embodiment, the external magnetic shell includes a first shell and a second shell, and the first shell and the second shell are connected and jointly surround the internal magnet. In this solution, the external magnetic shell is designed as two parts: the first shell and the second shell, and the first shell and the second shell are connected and jointly surround the internal magnet, so that manufacturing costs of this solution are relatively low, and this helps reduce costs of the magnetic element.

In an embodiment, the first shell forms first space, the second shell forms second space, the first space and the second space are connected to each other and jointly accommodate the internal magnet, and a gap is disposed between the internal magnet and an inner surface of the external magnetic shell. Advantages of this solution are: Assembly is easy, and in an assembling process, only the internal magnet needs to be fastened in the first shell or the second shell, and then the second shell and the second shell are fastened to each other.

The first shell and the second shell may be of a same structure. A connection between the first shell and the second shell may be planar connection, and the first shell and the second shell are connected and fastened by using glue. Advantages of this solution are: The first shell and the second shell do not need to be distinguished in a process of assembling the composite magnetic core, and because the first shell and the second shell are of the same structure, efficiency is high in an assembling and fastening process. In another embodiment, the connection between the first shell and the second shell may be connected in a concave-convex coordination manner, or the first shell and the second shell are mutually coordinated and connected by using a step structure.

In an embodiment, the first shell includes a first wall and a second wall that is bent and extended from an edge of the first wall, the second shell includes a third wall and a fourth wall that is bent and extended from an edge of the third wall, the first wall and the third wall are disposed opposite to each other, the second wall and the fourth wall are disposed opposite to each other, the first shell and the second shell are connected to form accommodating space of different sizes, and the accommodating space is used to accommodate the internal magnet. In this solution, an application range of the external magnetic shell is improved. One external magnetic shell may match internal magnets of different sizes, to form composite magnetic cores of different models. In addition, the external magnetic shell and the internal magnet in the composite magnetic core provided in this solution may be seamlessly connected, and the internal magnet is jointly located by using an inner surface of the first shell and an inner surface of the second shell. Another fastening medium is not needed between the internal magnet and the external magnetic shell, for example, glue does not need to be dispensed between the internal magnet and the external magnetic shell. In this solution, a volume of the composite magnetic core can be reduced, and this is conducive to a design of a small size of the magnetic element.

In an embodiment, the external magnetic shell is of an annular structure and forms annular accommodating space used for accommodating the internal magnet, the external magnetic shell includes an inner wall and an outer wall that are stacked in a radial direction, the inner wall forms a through hole, the composite magnetic core further includes a magnetic sheet, the magnetic sheet is located in the through hole and is connected to the inner wall, and the magnetic sheet separates the through hole into two sub-holes. The magnetic sheet has a magnetic conduction function, and can increase differential-mode inductance. In an embodiment, in the magnetic element, air passes through a differential-mode magnetic path, and magnetic permeability of the air is 1. In this solution, the magnetic sheet is added, and magnetic permeability of the magnetic sheet is far greater than that of air, and the magnetic permeability of the magnetic sheet may reach tens to several thousand. Magnetic sheets of different materials have different magnetic permeability. Because the magnetic sheet is disposed in the through hole in this application, it may be understood as that a part of the air is replaced by the magnetic sheet, so that the inductance is increased. Therefore, in this solution, the differential-mode inductance can be increased.

In an embodiment, a material of the magnetic sheet is the same as that of the external magnetic shell.

In an embodiment, the magnetic sheet and the external magnetic shell are in an integrated structure.

In an embodiment, the magnetic sheet and the external magnetic shell are in a separated structure.

In an embodiment, the magnetic sheet is entirely accommodated inside the through hole.

In an embodiment, thickness of the magnetic sheet is greater than or equal to 1 mm. In this solution, the thickness of the magnetic sheet is limited to be greater than 1 mm, so that a relatively good effect of increasing common-mode inductance can be implemented.

In an embodiment, thickness of the magnetic sheet is the same as thickness of the external magnetic shell, and the thickness of the external magnetic shell is greater than or equal to 1 mm.

In an embodiment, the magnetic sheet may be a rigid material. In this solution, thickness of the magnetic sheet may be set to be relatively thick, and may be greater than or equal to 1 mm, to ensure that magnetic permeability of the magnetic sheet can meet a filtering requirement of the magnetic element.

In an embodiment, the magnetic sheet may alternatively be a flexible sheet material. In this solution, thickness of the magnetic sheet may be relatively thin, for example, is less than 1 mm, and the magnetic sheet may be bent and extended in the through hole. A volume occupied by the magnetic sheet in the through hole is set based on a size of the winding and a size of the through hole by using a characteristic that the flexible sheet material is easily bent. In this way, a volume occupied by the magnetic sheet may be as large as possible, to obtain relatively large common-mode inductance.

In an embodiment, the magnetic element is a common-mode inductor, and may be a two-phase common-mode inductor or a three-phase common-mode inductor.

According to a second aspect, an electronic device is provided. The electronic device includes a circuit board and the magnetic element provided in any one of the embodiments of the first aspect. The magnetic element is disposed on the circuit board, and the winding is electrically connected to the circuit board.

BRIEF DESCRIPTION OF DRAWINGS

To describe technical solutions in embodiments of this application or in the background more clearly, the following describes the accompanying drawings used in embodiments of this application or in the background.

DESCRIPTION OF EMBODIMENTS

The following describes embodiments of this application with reference to the accompanying drawings in embodiments of this application.

Figure 1:
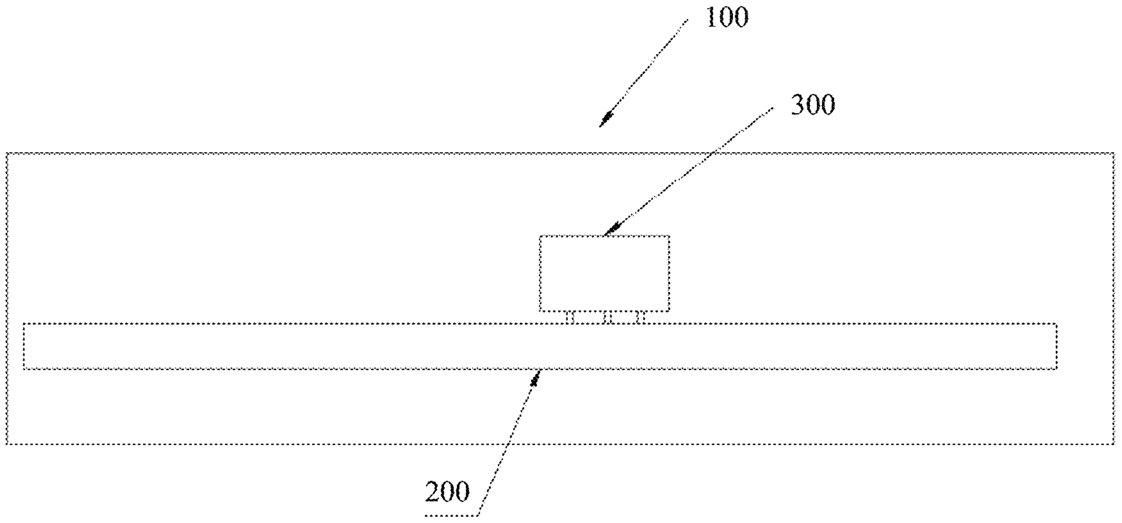
FIG. 1 is a schematic diagram of an electronic device according to an embodiment.

As shown in FIG. 1, a circuit board 200 is disposed in an electronic device 100 in an embodiment, and a magnetic element 300 is disposed on the circuit board 200. The magnetic element 300 may be a common-mode inductor, and plays a role of EMI filtering to suppress outward radiation of an electromagnetic wave generated by a high-speed signal cable in the electronic device. In an embodiment, the electronic device 100 may be a computer, a router, another communication device, a terminal device, or the like, or the electronic device 100 may be a mobile phone, a tablet computer, a vehicle-mounted computer, an intelligent wearable product, or the like. A specific type of the electronic device is not specifically limited in this embodiment of this application, and the electronic device needs to be a device with the magnetic element. In an embodiment, a switch-mode power supply circuit is disposed in the electronic device 100. The magnetic element 300 provided in this application may be disposed in the switch-mode power supply circuit to filter a common-mode electromagnetic interference signal. The magnetic element 300 may be a two-phase common-mode inductor, or may be a three-phase common-mode inductor. In an embodiment, a winding of the magnetic element 300 is electrically connected to the circuit board 200.

Figure 2:
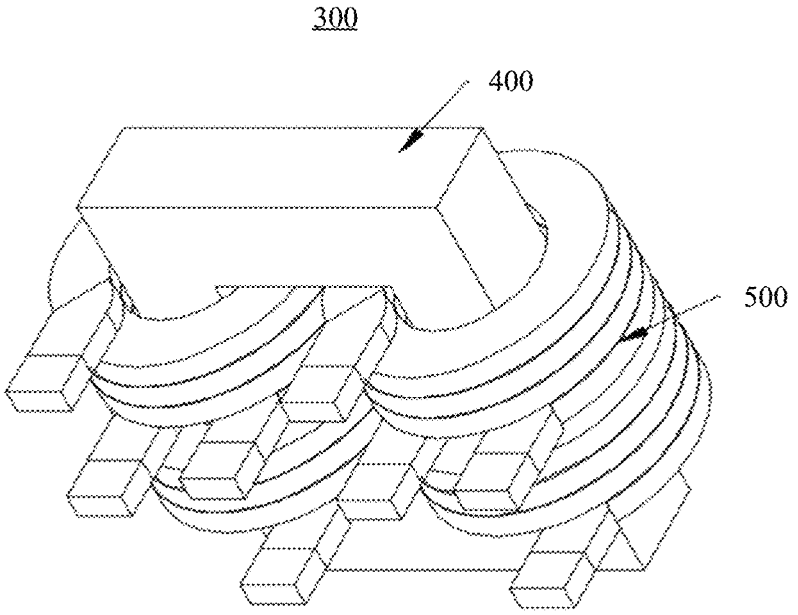
FIG. 2 is a schematic diagram of a magnetic element according to an embodiment.
Figure 3:
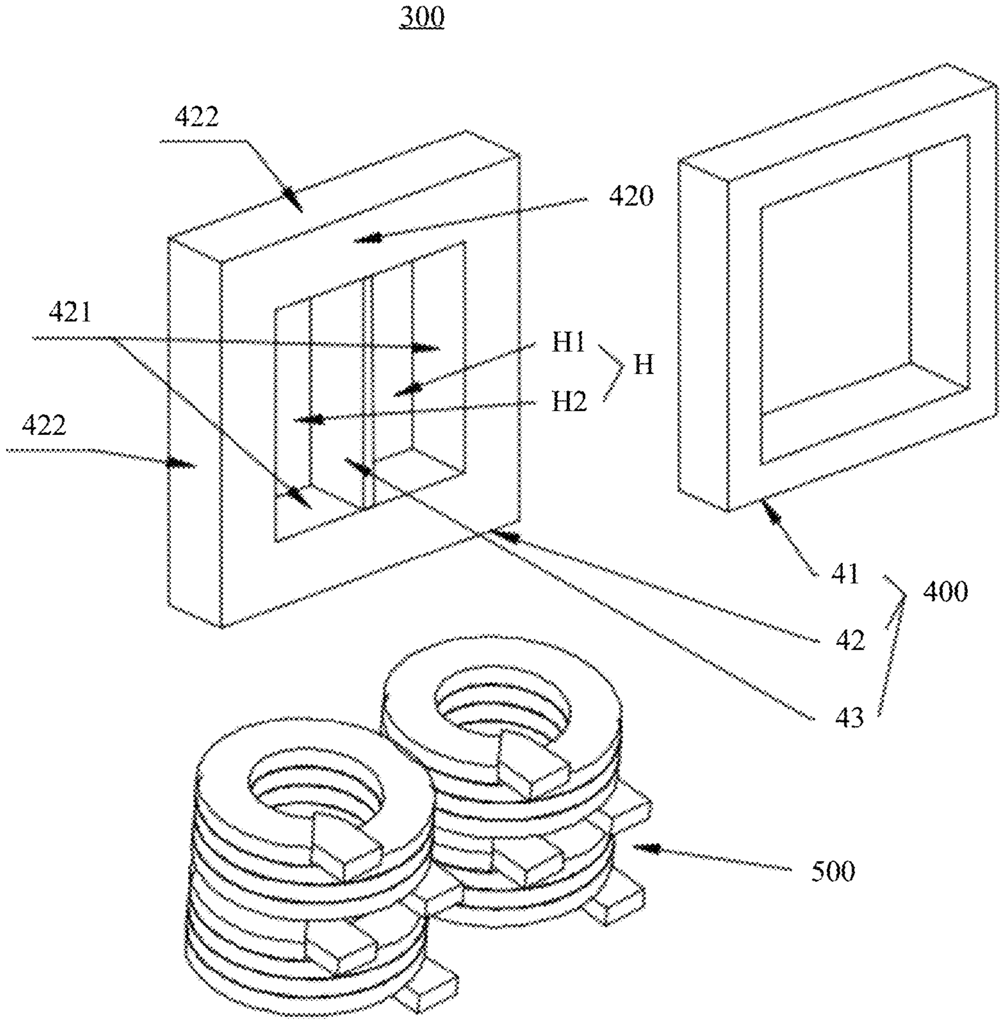
FIG. 3 is a schematic three-dimensional decomposed diagram of the magnetic element shown in FIG. 2.

A two-phase common-mode inductor is used as an example for description. In an embodiment, as shown in FIG. 2 and FIG. 3, the magnetic element 300 includes a composite magnetic core 400 and a winding 500, and the winding 500 is wound around the composite magnetic core 400. The winding 500 is a coil, and the winding 500 may be formed by winding an enameled copper wire. The enameled copper wire includes a round wire and a flat wire. A material of the winding is not limited in this application. The composite magnetic core 400 includes an internal magnet 41 and an external magnetic shell 42. The external magnetic shell 42 partially or entirely covers a periphery of the internal magnet 41.

The internal magnet 41 is formed by winding a strip material. In an embodiment, the strip material of the internal magnet 41 in the composite magnetic core 400 provided in this application may be a nanocrystalline material or an amorphous strip material, and the internal magnet 41 may be made by a winder. For the internal magnet formed by winding the strip material, a coil cannot be directly wound on an outer surface of the internal magnet, because pulling stress acting on a surface of the internal magnet 41 may be generated in a process of winding the coil, and the stress may destroy the internal magnet 41 and affect a filtering function of the magnetic element 300. Therefore, a protective structure needs to be disposed on the outer surface of the internal magnet 41. Because the external magnetic shell 42 in the composite magnetic core 400 provided in this application has a magnetic material, as a protective shell covering the periphery of the internal magnet 41, the external magnetic shell 42 can not only protect the internal magnet 41 from pulling stress in a wire winding process, but also increase common-mode impedance of the composite magnetic core 400 and improve the filtering function of the magnetic element 300. In an embodiment, the external magnetic shell 42 covers the periphery of the internal magnet 41 and is fixedly connected to the internal magnet 41, and the external magnetic shell 42 may protect the internal magnet 41. The external magnetic shell 42 in the composite magnetic core 400 provided in this application has the magnetic material, the winding 500 is wound on an outer surface of the external magnetic shell 42, and the external magnetic shell 42 has a function of filtering electromagnetic noise. Therefore, the composite magnetic core 400 provided in this application can improve a filtering effect of the magnetic element 300. If the external magnetic shell 42 has no magnetic material, but has only a function of protecting the internal magnet 41, and the external magnetic shell 42 is made of a non-magnetic material, such an external magnetic shell 42 in the composite magnetic core 400 cannot participate in the filtering function of the magnetic element 300. If the external magnetic shell 42 occupies space of the composite magnetic core 400 but has no filtering function, this is not conducive to a miniaturization design of the composite magnetic core 400, and consequently, a volume and costs of a component (that is, the magnetic element 300) are increased.

In an embodiment, a material of the external magnetic shell 42 is ferrite. In an embodiment, the material of the external magnetic shell 42 is alloy magnetic powder (which may also be understood as an alloy powder magnet). In an embodiment, the external magnetic shell 42 may be a combination of manganese zinc ferrite, nickel zinc ferrite, and alloy magnetic powder. If the non-magnetic material is replaced with a magnetic material, common-mode impedance of the magnetic element 300 can be increased, and this is conducive to miniaturization and costs reduction of the magnetic element 300. For a magnetic element in a conventional technology, for an electromagnetic wave signal of 100 kHz, common-mode impedance of the magnetic element is 2000Ω. For the magnetic element 300 provided in this application, if ferrite whose magnetic permeability is 7000, for example, is used as a solution of a nanocrystalline protective shell whose magnetic permeability is 30000, for example, that is, the material of the external magnetic shell 42 is ferrite whose magnetic permeability is 7000, and a material of the internal magnet 41 is nanocrystalline whose magnetic permeability is 30000, for an electromagnetic wave signal of 100 kHz, common-mode impedance of the magnetic element 300 is 4060Ω. It can be learned that, in a same size, a filtering effect of the magnetic element 300 provided in this application is significantly improved.

In an embodiment, a material of the internal magnet 41 in the composite magnetic core 400 is a nanocrystalline strip material, and a material of the external magnetic shell 42 in the composite magnetic core 400 is ferrite. In this solution, performance of a common-mode inductor of the magnetic element 300 can be improved, and a volume and costs of the magnetic element 300 can be reduced. In an embodiment, in this solution, the material of the internal magnet and the material of the external magnetic shell are limited, and the internal magnet of the nanocrystalline strip material and the external magnetic shell of the ferrite are combined in one composite magnetic core, so that performance of a common-mode inductor can be improved while a volume and costs of the composite magnetic core are properly controlled. In this way, not only the magnetic element has a relatively good filtering effect, but overall performance of the magnetic element can also be improved in a design condition that a relatively small volume and relatively low costs are controlled.

In an embodiment, a material of the internal magnet 41 in the composite magnetic core 400 is a nanocrystalline strip material, and a material of the external magnetic shell 42 in the composite magnetic core 400 is a combination of manganese zinc ferrite, nickel zinc ferrite, and alloy magnetic powder. In this solution, the material of the internal magnet and the material of the external magnetic shell are limited, and the internal magnet of the nanocrystalline strip material matches the external magnetic shell made of the combined material, so that wideband (150 kHz to 300 MHz) filtering can be implemented. In other words, in this solution, a frequency range of an electromagnetic filtering signal filtered by the magnetic element 300 is relatively wide, and may be 150 kHz to 300 MHz. In this solution, the volume and the costs of the magnetic element 300 can also be reduced. A filtering range of a magnetic element in a conventional technology is (150 kHz to 30 MHz, or 30 MHz to 300 MHz). Compared with the conventional technology, filtering bandwidth is widened in this application.

As shown in FIG. 2 and FIG. 3, in an embodiment, the external magnetic shell 42 is of an annular structure and forms annular accommodating space 420 used for accommodating the internal magnet 41 (a reference numeral 420 in FIG. 3 means space enclosed inside the external magnetic shell 42, and the external magnetic shell 42 is a hollow structure). In an embodiment, an outer contour of the annular structure formed by the external magnetic shell 42 is square, and an inner contour is also square. The internal magnet 41 and the external magnetic shell have similar structure forms but different sizes. The internal magnet 41 may be mounted inside the external magnetic shell 42 and surrounded by the external magnetic shell 42. The external magnetic shell 42 includes an inner wall 421 and an outer wall 422 that are stacked in a radial direction, and the inner wall 421 forms a through hole H. The composite magnetic core 400 further includes a magnetic sheet 43, and the magnetic sheet 43 is located in the through hole H and is connected to the inner wall 421. In an embodiment, the composite magnetic core 400 is applied to a two-phase common-mode inductor, there are two groups of windings 500, and there is one magnetic sheet 43. The magnetic sheet 43 separates the two groups of windings 500 (as shown in FIG. 2), and the magnetic sheet 43 separates the through hole H into two sub-holes H1 and H2. One sub-hole H1 is used to accommodate one group of windings 500, and the other sub-hole H2 is used to accommodate the other group of windings 500. In this embodiment, the magnetic sheet 43 is disposed in the through hole H enclosed by the external magnetic shell 42, and the magnetic sheet 43 has a magnetic conduction function, and can increase differential-mode inductance. In an embodiment, in the magnetic element, air passes through a differential-mode magnetic path, and magnetic permeability of the air is 1. In this solution, the magnetic sheet 43 is added, and magnetic permeability of the magnetic sheet 43 is far greater than that of air, and the magnetic permeability of the magnetic sheet 43 may reach tens to several thousand. Magnetic sheets 43 of different materials have different magnetic permeability. Because the magnetic sheet 43 is disposed in the through hole H in this application, it may be understood as that a part of the air is replaced by the magnetic sheet 43, so that the inductance is increased. Therefore, in this solution, the differential-mode inductance can be increased.

A material of the magnetic sheet 43 may be the same as the material of the external magnetic shell 42. This solution facilitates a manufacturing process of the external magnetic shell 42 and the magnetic sheet 43. The magnetic sheet 43 and the external magnetic shell 42 may be in an integrated structure. The material of the magnetic sheet 43 may alternatively be different from the material of the external magnetic shell. The magnetic sheet 43 and the external magnetic shell 42 may be designed as a separated structure. For example, the magnetic sheet 43 and the external magnetic shell 42 may be directly fixedly connected through cooperation of a buckle and a slot, or may be connected by using another conversion bracket. A specific position of the magnetic sheet 43 in the through hole H may be adjusted in a separated design, to adjust filtering performance of the magnetic element 300.

Figure 4:
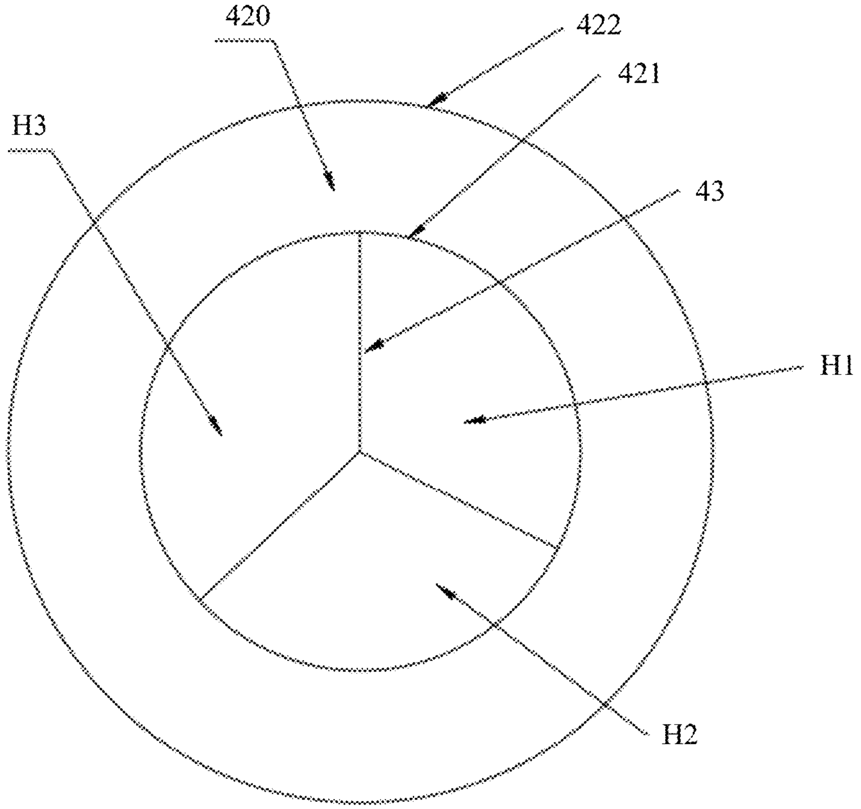
FIG. 4 is a schematic diagram of structures of an external magnetic shell and a magnetic sheet in a composite magnetic core in a magnetic element according to an embodiment.

In another embodiment, as shown in FIG. 4, the composite magnetic core 400 is applied to a three-phase common-mode inductor, there are three groups of windings 500, there are three magnetic sheets 43, and the magnetic sheets 43 separate the through hole H into three sub-holes H1, H2, and H3. The three sub-holes H1, H2, and H3 are separately used to accommodate different windings. In this embodiment, alternatively, there is one magnetic sheet 43. A form of the magnetic sheet 43 is different from a form shown in FIG. 3. The magnetic sheet 43 is non-straight or non-plate-shaped, and may have a plurality of branches, for example, three branches, and edges of the three branches are fastened together, and an included angle between two branches is 120 degrees. In this way, the through hole may be divided into three sub-holes H1, H2, and H3 by one magnetic sheet 43. In FIG. 4, the inner wall 421, the outer wall 422, and the magnetic sheet 43 are schematically represented by using lines. In an actual product, structures represented by these lines have specific thickness, and are entity structures. An edge of the magnetic sheet 43 is fixedly connected to an outer surface of the inner wall 421.

In an embodiment, the edge of the magnetic sheet 43 may not exceed a boundary of the through hole H; in other words, the magnetic sheet 43 is entirely accommodated in the through hole H. This solution helps implement a connection between the magnetic sheet 43 and the external magnetic shell 42, and facilitates manufacture and winding. In another embodiment, an outer contour of the magnetic sheet 43 may alternatively exceed a boundary of the through hole H, and may be implemented in the magnetic element 300. An orthogonal projection of the winding on the magnetic sheet 43 falls within the magnetic sheet 43. In this solution, a clearer effect of increasing the differential-mode inductance is implemented. Certainly, an area of an orthogonal projection of the winding in a plane in which the magnetic sheet 43 is located may also be greater than an area of the magnetic sheet 43.

In an embodiment, thickness of the magnetic sheet 43 is greater than or equal to 1 mm. In this solution, the thickness of the magnetic sheet is limited to be greater than 1 mm, so that a relatively good effect of increasing common-mode inductance can be implemented.

In an embodiment, thickness of the magnetic sheet 43 is the same as thickness of the external magnetic shell 42, and the thickness of the external magnetic shell 42 is greater than or equal to 1 mm.

In an embodiment, the magnetic sheet 43 may be a rigid material. In this solution, thickness of the magnetic sheet 43 may be set to be relatively thick, and may be greater than or equal to 1 mm, to ensure that magnetic permeability of the magnetic sheet 43 can meet a filtering requirement of the magnetic element.

In an embodiment, the magnetic sheet 43 may alternatively be a flexible sheet material. In this solution, thickness of the magnetic sheet 43 may be relatively thin, for example, is less than 1 mm, and the magnetic sheet 43 may be bent and extended in the through hole H. A volume occupied by the magnetic sheet 43 in the through hole H is set based on a size of the winding and a size of the through hole H by using a characteristic that the flexible sheet material is easily bent. In this way, a volume occupied by the magnetic sheet 43 may be as large as possible, to obtain relatively large common-mode inductance.

The external magnetic shell 42 in the composite magnetic core 400 provided in this application may be an integrated structure, and is formed on the outer surface of the internal magnet 41 through packaging or coating. For example, the external magnetic shell 42 may be formed on the outer surface of the internal magnet 41 through spraying or electroplating, or the external magnetic shell 42 may be fabricated on the outer surface of the internal magnet 41 by using an integrated injection molding process. The external magnetic shell 42 may be in an entirely closed structure without any gap (or air gap). In another embodiment, a gap (or an air gap) may alternatively be disposed on the external magnetic shell 42, magnetism of the composite magnetic core is adjusted by disposing the gap (or the air gap), and a filtering effect of the magnetic element 300 is controlled.

Figure 5:
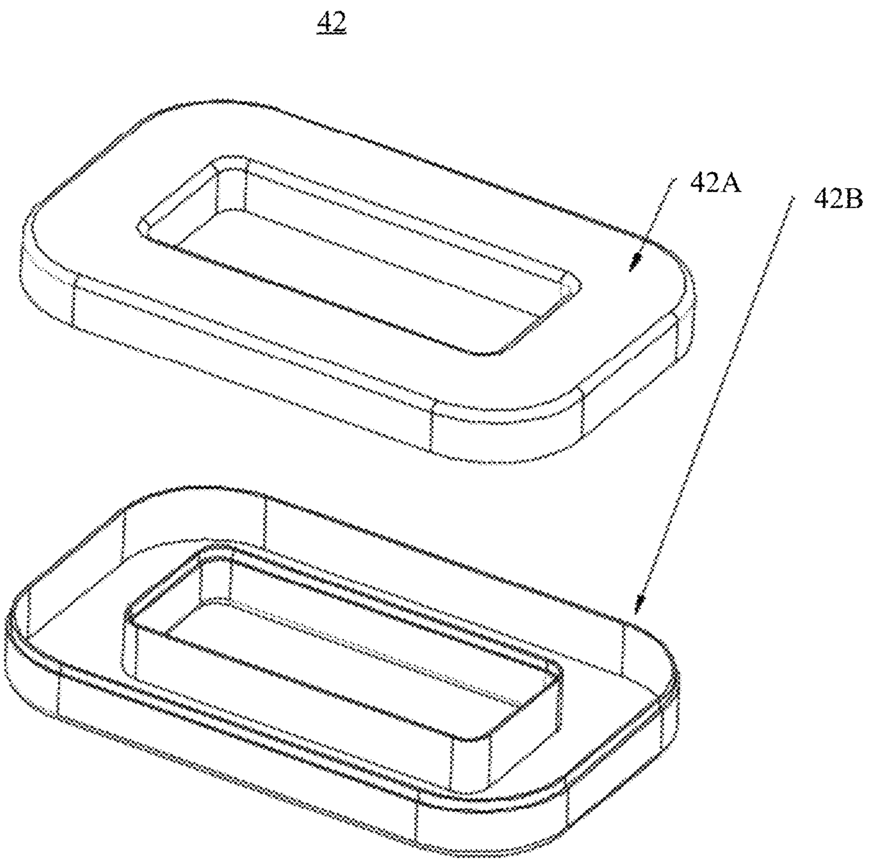
FIG. 5 is a schematic three-dimensional decomposed diagram of an external magnetic shell in a composite magnetic core in a magnetic element according to an embodiment.
Figure 6:
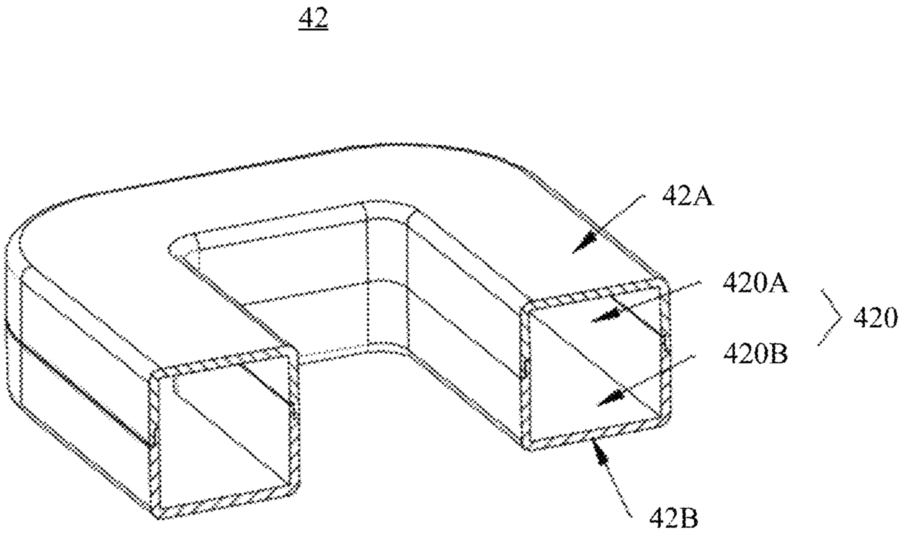
FIG. 6 is a schematic diagram of a cross section of an external magnetic shell in a composite magnetic core in a magnetic element according to an embodiment.
Figure 7:
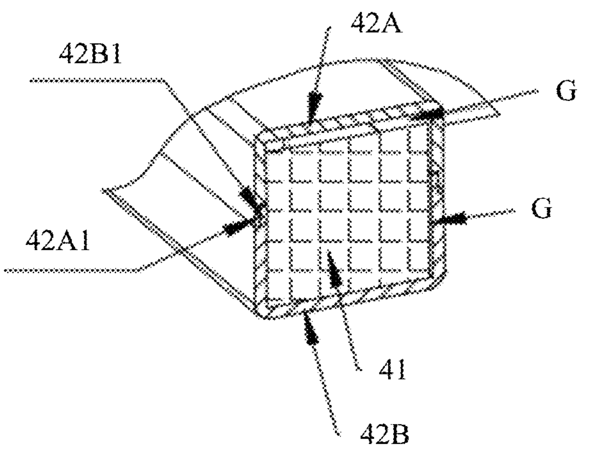
FIG. 7 is a schematic diagram of a state in which an internal magnet is mounted inside the external magnetic shell shown in FIG. 6.

As shown in FIG. 5, FIG. 6, and FIG. 7, in another embodiment, the external magnetic shell 42 may alternatively be a separated structure. For example, the external magnetic shell 42 includes a first shell 42A and a second shell 42B, and the first shell 42A and the second shell 42B are connected to jointly surround the internal magnet 41.

The first shell 42A and the second shell 42B are connected or fastened to each other to form the external magnetic shell 42, the first shell 42A forms first space 420A, the second shell 42B forms second space 420B, the first space 420A and the second space 420B are connected to form accommodating space 420, and the internal magnet 41 is jointly accommodated, and a gap G is disposed between the internal magnet 41 and an inner surface of the external magnetic shell 42. The internal magnet 41 and the inner surface of the external magnetic shell 42 may be fastened by an adhesive. As shown in FIG. 7, two adjacent surfaces of the internal magnet 41 are bonded to and fixedly connected to the inner surface of the external magnetic shell 42. A gap G may exist between the inner surface of the external magnetic shell 42 and the other two surfaces of the internal magnet 41. Because there is a tolerance between the internal magnet 41 and the external magnetic shell 42 in a processing and assembling process, or a planeness problem is caused due to a processing procedure of the outer surface of the internal magnet 41 and the inner surface of the external magnetic shell 42, the internal magnet 41 and the external magnetic shell 42 cannot be entirely bonded in a contact process, and consequently, sizes of the internal magnet 41 and the external magnetic shell 42 do not entirely match each other (when the sizes of the internal magnet 41 and the external magnetic shell 42 entirely match each other, the outer surface of the internal magnet 41 may be entirely bonded to the external magnetic shell 42). In this condition, there is the gap G between the internal magnet 41 and the external magnetic shell 42, but the gap G does not affect normal working of the composite magnetic core 400.

In an embodiment, the first shell 42A and the second shell 42B may be of a same structure. A connection between the first shell 42A and the second shell 42B may be planar connection, and the first shell 42A and the second shell 42B are connected and fastened by using glue. Advantages of this solution are: The first shell 42A and the second shell 42B do not need to be distinguished in a process of assembling the composite magnetic core, and because the first shell 42A and the second shell 42B are of the same structure, efficiency is high in an assembling and fastening process. In another embodiment, the connection between the first shell 42A and the second shell 42B may be connected in a concave-convex coordination manner, or the first shell 42A and the second shell 42B are mutually coordinated and connected by using a step structure. In an embodiment shown in FIG. 5 to FIG. 7, a connection surface between the first shell 42A and the second shell 42B includes an L-shaped surface or a Z-shaped surface. This connection manner helps improve a sealing effect at the connection between the first shell 42A and the second shell 42B. In an embodiment, the first shell 42A includes a first connection part 42A1, the second shell 42B includes a second connection part 42B1, and a connection surface of the first shell 42A and the second shell 42B is a surface in which the first connection part 42A1 and the second connection part 42B1 are in contact with each other. A direction extending from the inner surface of the external magnetic shell 42 to the outer surface of the external magnetic shell 42 is a radial direction. In the radial direction, the first connection part 42A1 and the second connection part 42B1 are stacked. In this embodiment, the first connection part 42A1 is disposed around a periphery of the second connection part 42B1, and the first connection part 42A1 and the second connection part 42B1 may be connected and sealed by using glue.

Figure 8:
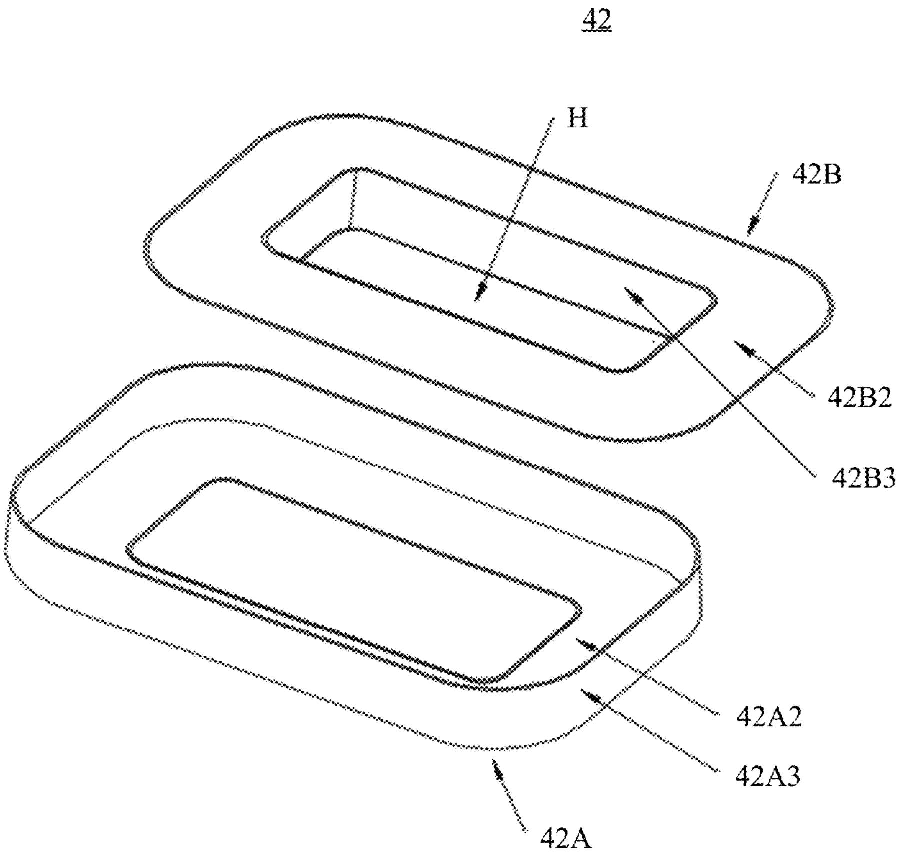
FIG. 8 is a schematic three-dimensional decomposed diagram of an external magnetic shell in a composite magnetic core in a magnetic element according to an embodiment.
Figure 9:
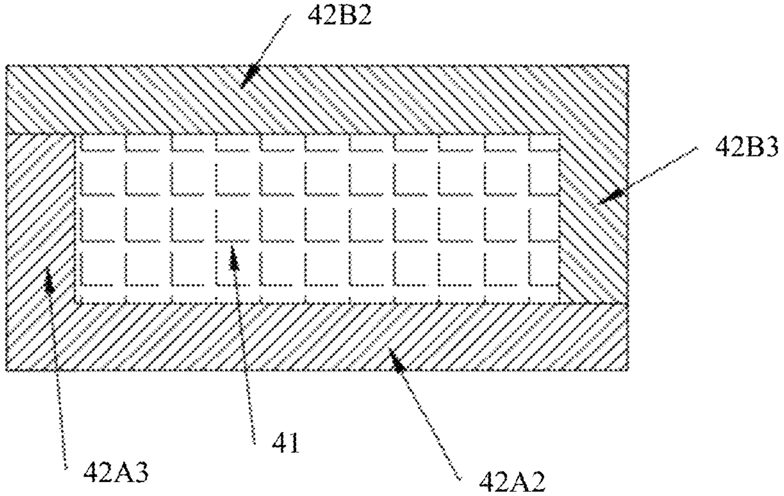
FIG. 9 is a schematic diagram of a cross section in a state in which an internal magnet is mounted inside the external magnetic shell in the composite magnetic core in the magnetic element shown in FIG. 8.
Figure 10:
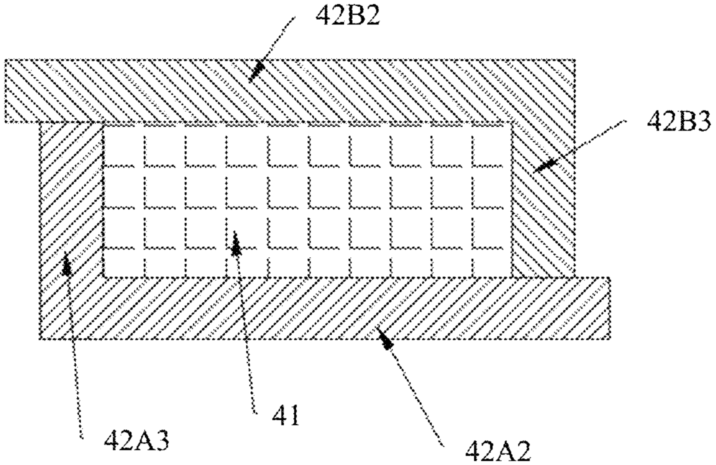
FIG. 10 is a schematic diagram of a cross section in another state in which an internal magnet is mounted inside the external magnetic shell in the composite magnetic core in the magnetic element shown in FIG. 8.

In an embodiment, after being connected, the first shell 42A and the second shell 42B may form accommodating space 420 of different sizes. As shown in FIG. 8, FIG. 9, and FIG. 10, the first shell 42A includes a first wall 42A2 and a second wall 42A3 that is bent and extended from an edge of the first wall 42A2, the second shell 42B includes a third wall 42B2 and a fourth wall 42B3 that is bent and extended from an edge of the third wall 42B2, the first wall 42A2 and the third wall 42B2 are disposed opposite to each other, the second wall 42A3 and the fourth wall 42B3 are disposed opposite to each other, the first shell 42A and the second shell 42B are connected to form accommodating space of different sizes, and the accommodating space is used to accommodate the internal magnet 41. As shown in FIG. 9, the external magnetic shell 42 and the internal magnet 41 in the composite magnetic core 400 provided in this solution may be seamlessly connected, and the internal magnet 41 is jointly located by using an inner surface of the first shell 42A and an inner surface of the second shell 42B. Another fastening medium is not needed between the internal magnet 41 and the external magnetic shell 42, for example, glue does not need to be dispensed between the internal magnet 41 and the external magnetic shell 42. In this way, a volume of the composite magnetic core 400 can be reduced, and this is conducive to a design of a small size of the magnetic element 300. With reference to FIG. 9 and FIG. 10, a size of the internal magnet 41 in the solution shown in FIG. 10 is less than a size of the internal magnet 41 in the solution shown in FIG. 9. For the external magnetic shell 42, when a position at which the first shell 42A and the second shell 42B are connected is different, a size of the accommodating space inside the external magnetic shell 42 can be adjusted. Therefore, the external magnetic shell 42 provided in this solution can match internal magnets 41 of more sizes, to form a plurality of composite magnetic cores 400 of different sizes, and is widely applied.

In the embodiment shown in FIG. 8, the first wall 42A2 of the first shell 42A and the third wall 42B2 of the second shell 42B form a top wall and a bottom wall of the external magnetic shell 42, and the first wall 42A2 and the third wall 42B2 may be the same in shapes and sizes. Both the first wall 42A2 and the third wall 42B2 may be of a flat plate-shaped structure, and both the first wall 42A2 and the third wall 42B2 may alternatively be of an arcuate plate-shaped structure. The second wall 42A3 of the first shell 42A forms an outer wall of the external magnetic shell 42, the fourth wall 42B3 of the second shell 42B forms an inner wall of the external magnetic shell 42, the fourth wall 42B3 forms the through hole H of the external magnetic shell 42, the second wall 42A3 is located on a periphery of the fourth wall 42B3, and an area between the second wall 42A3 and the fourth wall 42B3 is an annular area. An inner contour and an outer contour of the annular area may be square, circular, or another shape, and the internal magnet 41 is accommodated in the annular area.

Figure 11:
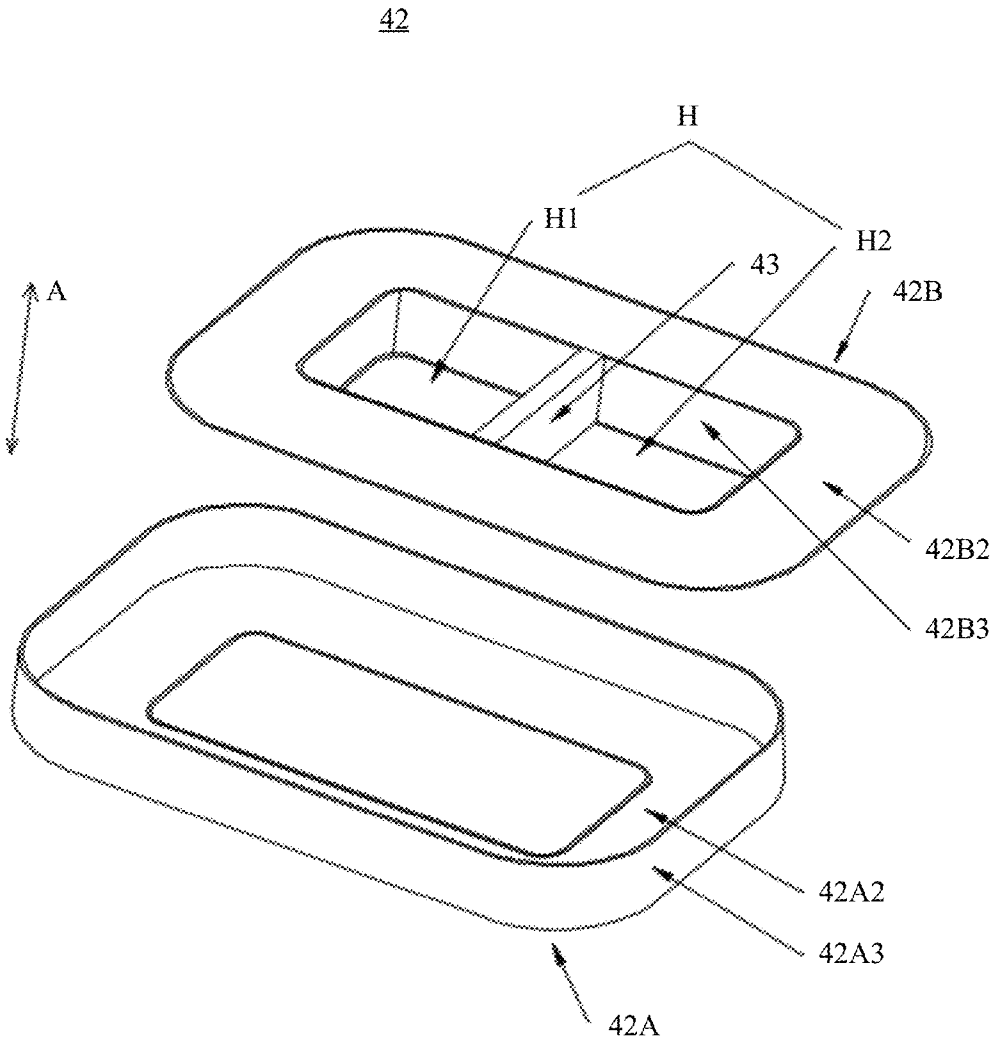
FIG. 11 is a schematic three-dimensional decomposed diagram of an external magnetic shell in a composite magnetic core in a magnetic element according to an embodiment.

In an embodiment, as shown in FIG. 11, the external magnetic shell 42 includes a first shell 42A and a second shell 42B. A structure of the first shell 42A is the same as that in the embodiment shown in FIG. 8. A structure of the second shell 42B is different from that in the embodiment shown in FIG. 8 in that the second shell 42B includes a magnetic sheet 43. In this embodiment, the magnetic sheet 43 is a flat plate-shaped structure, two opposite ends of the magnetic sheet 43 are connected to a fourth wall 42B3 of the second shell 42B, and the magnetic sheet 43 separates a through hole H formed by the fourth wall 42B3 into two sub-holes H1 and H2. In another embodiment, the magnetic sheet 43 may alternatively be arcuate plate-shaped.

In the embodiment shown in FIG. 11, a first wall 42A2 of the first shell 42A and a third wall 42B2 of the second shell 42B are disposed at intervals in a first direction A, and a size of the magnetic sheet 43 in the first direction A may be less than or equal to a vertical distance between an outer surface of the first wall 42A2 and an outer surface of the third wall 42B2. It may also be understood as that a top surface of the magnetic sheet 43 is flush with the outer surface of the first wall 42A2, and a bottom surface of the magnetic sheet 43 is flush with the outer surface of the third wall 42B2. The outer surface of the first wall 42A2 is a surface that is of the first wall 42A2 and that is away from the third wall 42B2, and the outer surface of the third wall 42B2 is a surface that is of the third wall 42B2 that is away from the first wall 42A2.

The external magnetic shell 42 provided in the foregoing embodiment entirely covers the internal magnet 41, to provide full protection for the internal magnet 41. In another embodiment, the external magnetic shell 42 may alternatively partially cover the internal magnet 41, and covers only a part of the internal magnet 41 corresponding to the winding. For example, as shown in FIG. 2 and FIG. 3, in this embodiment, the composite magnetic core 400 is approximately rectangular in shape, and includes four magnetic pillars, and two magnetic pillars are opposite to each other. The winding 500 is wound around left and right magnetic pillars, and no winding is disposed on peripheries of upper and lower magnetic pillars. Based on this case, the external magnetic shell 42 may be disposed only on peripheries of the left and right magnetic pillars, and no external magnetic shell may be disposed at positions of the upper and lower magnetic pillars. The external magnetic shell can protect the internal magnet and increase the common-mode impedance of the magnetic element provided that the winding is wound on the external magnetic shell.

The foregoing embodiments are merely intended for describing the technical solutions of this application, but not for limiting this application. Although this application is described in detail with reference to the foregoing embodiments, a person of ordinary skill in the art should understand that modifications to the technical solutions recorded in the foregoing embodiments or equivalent replacements to some technical features thereof may still be made, without departing from the scope of the technical solutions of embodiments of this application.

What is claimed is:

1. A magnetic element, comprising:

a composite magnetic core comprising an internal magnet and an external magnetic shell, wherein the internal magnet is formed by a wound strip material, the external magnetic shell partially or entirely covers a periphery of the internal magnet, and the external magnetic shell is fixedly connected to the internal magnet; and a winding on an outer surface of the external magnetic shell, wherein the external magnetic shell is configured to protect the internal magnet from pulling force in a winding process of the winding, and the external magnetic shell is configured to increase common-mode impedance of the magnetic element;

wherein the magnetic element is used in an electronic device and configured to suppress outward radiation of an electromagnetic wave generated by a high-speed signal cable in the electronic device.

2. The magnetic element according to claim 1, wherein a material of the external magnetic shell comprises at least one of: ferrite or alloy magnetic powder.

3. The magnetic element according to claim 1, wherein a material of the internal magnet comprises at least one of: amorphous alloy or nanocrystalline.

4. The magnetic element according to claim 1, wherein a material of the internal magnet is a nanocrystalline strip material, and a material of the external magnetic shell is ferrite.

5. The magnetic element according to claim 1, wherein a material of the internal magnet is a nanocrystalline strip material, and a material of the external magnetic shell is a combination of manganese zinc ferrite, nickel zinc ferrite, and alloy magnetic powder.

6. The magnetic element according to claim 1, wherein the external magnetic shell is an integrated structure, and is formed on an outer surface of the internal magnet.

7. The magnetic element according to claim 1, wherein the external magnetic shell comprises a first shell and a second shell, and the first shell and the second shell are connected and jointly surround the internal magnet.

8. The magnetic element according to claim 7, wherein the first shell forms a first space, the second shell forms a second space, the first space and the second space are connected to each other and jointly accommodate the internal magnet, and a gap is disposed between the internal magnet and an inner surface of the external magnetic shell.

9. The magnetic element according to claim 7, wherein the first shell comprises a first wall and a second wall that is bent and extended from an edge of the first wall, the second shell comprises a third wall and a fourth wall that is bent and extended from an edge of the third wall, the first wall and the third wall are disposed opposite to each other, the second wall and the fourth wall are disposed opposite to each other, the first shell and the second shell are connected to form accommodating space of different sizes, and the accommodating space is used to accommodate the internal magnet.

10. The magnetic element according to claim 1, wherein the external magnetic shell is of an annular structure and forms annular accommodating space used for accommodating the internal magnet, the external magnetic shell comprises an inner wall and an outer wall that are stacked in a radial direction, the inner wall forms a through hole, the composite magnetic core further comprises a magnetic sheet located in the through hole and connected to the inner wall, and the magnetic sheet separates the through hole into two or three sub-holes.

11. The magnetic element according to claim 10, wherein a material of the magnetic sheet is the same as that of the external magnetic shell.

12. The magnetic element according to claim 10, wherein the magnetic sheet and the external magnetic shell are in an integrated structure.

13. The magnetic element according to claim 10, wherein the magnetic sheet and the external magnetic shell are in a separated structure.

14. The magnetic element according to claim 10, wherein the magnetic sheet is entirely accommodated inside the through hole.

15. The magnetic element according to claim 1, wherein the magnetic element is a common-mode inductor.

16. An electronic device, comprising:

a circuit board; and a magnetic element disposed on the circuit board;

wherein the magnetic element comprises:

a composite magnetic core comprising an internal magnet and an external magnetic shell, wherein the internal magnet is formed by a wound strip material, the external magnetic shell partially or entirely covers a periphery of the internal magnet, the external magnetic shell is fixedly connected to the internal magnet, and a winding on an outer surface of the external magnetic shell, wherein the external magnetic shell is configured to protect the internal magnet from pulling force in a winding process of the winding, the external magnetic shell is configured to increase common-mode impedance of the magnetic element, and the winding is electrically connected to the circuit board;

wherein the magnetic element is configured to suppress outward radiation of an electromagnetic wave generated by a high-speed signal cable in the electronic device.

17. The electronic device according to claim 16, wherein the external magnetic shell comprises a first shell and a second shell, and the first shell and the second shell are connected and jointly surround the internal magnet.

18. The electronic device according to claim 17, wherein the first shell forms a first space, the second shell forms a second space, the first space and the second space are connected to each other and jointly accommodate the internal magnet, and a gap is disposed between the internal magnet and an inner surface of the external magnetic shell.

19. The electronic device according to claim 17, wherein the first shell comprises a first wall and a second wall that is bent and extended from an edge of the first wall, the second shell comprises a third wall and a fourth wall that is bent and extended from an edge of the third wall, the first wall and the third wall are disposed opposite to each other, the second wall and the fourth wall are disposed opposite to each other, the first shell and the second shell are connected to form accommodating space of different sizes, and the accommodating space is used to accommodate the internal magnet.

20. The electronic device according to claim 16, wherein the external magnetic shell is of an annular structure and forms annular accommodating space used for accommodating the internal magnet, the external magnetic shell comprises an inner wall and an outer wall that are stacked in a radial direction, the inner wall forms a through hole, the composite magnetic core further comprises a magnetic sheet located in the through hole and connected to the inner wall, and the magnetic sheet separates the through hole into two or three sub-holes.

* * * * *